(12) United States Patent
Beslin et al.

(10) Patent No.: US 12,043,886 B2
(45) Date of Patent: Jul. 23, 2024

(54) THERMOMECHANICAL AGEING FOR 6XXX EXTRUSIONS

(71) Applicant: CONSTELLIUM SINGEN GMBH, Singen (DE)

(72) Inventors: Emmanuel Beslin, Vaux Milieu (FR); Jochen Frank, Watterdingen (DE); Martin Jarrett, Oxfordshire (GB); Alexis Skubich, Zurich (CH); Arnas Gerald Fitzner, Greater London (GB)

(73) Assignee: CONSTELLIUM SINGEN GMBH, Singen (DE)

( * ) Notice: Subject to any disclaimer, the term of this patent is extended or adjusted under 35 U.S.C. 154(b) by 39 days.

(21) Appl. No.: 16/342,745

(22) PCT Filed: Oct. 19, 2017

(86) PCT No.: PCT/EP2017/076794
§ 371 (c)(1),
(2) Date: Apr. 17, 2019

(87) PCT Pub. No.: WO2018/073389
PCT Pub. Date: Apr. 26, 2018

(65) Prior Publication Data
US 2020/0308681 A1    Oct. 1, 2020

(30) Foreign Application Priority Data
Oct. 20, 2016   (EP) ..................... 16194933

(51) Int. Cl.
*C22F 1/05*   (2006.01)
*B60R 19/18*  (2006.01)

(52) U.S. Cl.
CPC ................ *C22F 1/05* (2013.01); *B60R 19/18* (2013.01)

(58) Field of Classification Search
USPC ......................................................... 148/550
See application file for complete search history.

(56) References Cited

U.S. PATENT DOCUMENTS

| 5,527,404 A | 6/1996 | Warren |
| 2016/0304994 A1 | 10/2016 | Skubich et al. |

FOREIGN PATENT DOCUMENTS

| CN | 105814220 A | 7/2016 |
| EP | 0302623 A1 | 2/1989 |

(Continued)

OTHER PUBLICATIONS

Chinese Search Report for Application No. 2017800636790 dated Jun. 29, 2020.

(Continued)

*Primary Examiner* — Brian D Walck
(74) *Attorney, Agent, or Firm* — MCBEE MOORE & VANIK IP, LLC

(57) ABSTRACT

The present invention relates to extrusions for structural components, such as bumper, side impact beam, seat sill in vehicles and more particularly to a method for optimizing strength and energy absorption of 6XXX aluminium alloys extrusions by variations in thermomechanical ageing (TMA) consisting in i) an artificial preageing treatment with a duration t1 at a temperature T1 selected to increase the yield strength of said extrusion between 5% and 20%, said temperature T1 being typically between 120° C. and 180° C. and said duration t1 being typically between 1 and 100 hours, to obtain an artificially preaged extrusion, ii) a plastic deformation of said artificially preaged extrusion between 1% and 80% to obtain a deformed extrusion, iii) a final artificial ageing treatment of said deformed extrusion with a duration t2 at a temperature T2, said (Continued)

temperature T2 being typically between 140° C. and 200° C. and said the duration t2 being typically between 1 and 100 hours.

14 Claims, 4 Drawing Sheets

(56) References Cited

FOREIGN PATENT DOCUMENTS

| | | |
|---|---|---|
| EP | 2563944 B1 | 3/2013 |
| EP | 2883973 A1 | 6/2015 |
| EP | 2993244 A1 | 3/2016 |
| WO | 0238821 A1 | 5/2002 |

OTHER PUBLICATIONS

R. N. Lumley, R. N., et al., "Temper Developments Using Secondary Ageing," Materials Forum, (Jan. 2004), vol. 28: 85-95.

C. H. Liu, et al., "Enhancing electrical conductivity and strength in Al alloys by modification of conventional thermo-mechanical process," Materials & Design, (2015), vol. 87: 1-5.

Gaoyong Lin, et al., "Enhanced strength and electrical conductivity of Al—Mg—Si alloy by thermo-mechanical treatment," Materials Science and Engineering: A, (2016), vol. 650 : 210-217.

International Search Report received from corresponding PCT/EP2017/076794, dated Nov. 14, 2017.

Davis, J.R., "Aluminum and Aluminum Alloys," ASM Specialty Handbook, Aluminum and Aluminum Alloys, Jan. 1, 1993, pp. 18-23 and 685-686, XP002109672.

Hu, H.E. Wang, X.Y. & Deng, L., "Comparative study of hot-processing maps for 6061 aluminium alloy constructed from power constitutive equation and hyperbolic sine constitutive equation," Materials Science and Technology, vol. 30, No. 11, Apr. 29, 2014, pp. 1321-1327, XP055353379.

Matsuda, Kenji, et al., "Classification of metastable phases in Al—Mg2Si alloys by high resolution transmission electron microscopy (HRTEM)," Materials Science Forum, Trans Tech Publications Ltd—Switzerland, CH, vol. 217-222, No. pt 2, Jan. 1, 1996, pp. 707-712, XP009086765.

Mostafa Mansourinejad and Bahman Mirzakhani, "Influence of sequence of cold working and aging treatment on mechanical behaviour of 6061 aluminum alloy," Transactions of Nonferrous Metals Society of China, (2012), vol. 22, 2072-2079.

Patiphan Juijerm, et al., "Effects of pre-ageing on paint-bake-hardening response of aluminium alloy AA6110," International Conference on Science, Technology and Innovation for Sustainable Well-Being, (2009), 1-4.

Zhixiu Wang, et al., "Improving the strength and deuctility of Al—Mg—Si—Cu alloys by a novel thermo-mechanical treatment," Materials Science & Engineering A, (2014), vol. 607, 313-317.

"Brazing and Soldering," ASM Handbook Aluminum and Aluminum alloys, (1993).

THERMOMECHANICAL AGEING FOR 6XXX EXTRUSIONS

CROSS REFERENCE TO RELATED APPLICATIONS

This application is a National Stage entry of International Application No. PCT/EP2017/076794 filed 19 Oct. 2017, which claims priority to European Patent Application No. 16194933.4, filed 20 Oct. 2016.

BACKGROUND

Description of Related Art

The present invention relates to extrusions for structural components, such as bumper, side impact beam, seat sill in vehicles and more particularly to a method for optimizing strength and energy absorption of 6XXX aluminium alloys extrusions by variations in thermomechanical ageing (TMA).

Another aim of the invention is the product obtained by the process of the invention which offers a better compromise of strength and energy absorption than a product with a similar composition at peak aged temper processed conventionally.

The crashworthiness of aluminium in crash relevant components or structures for automotive applications has been extensively investigated for sheet, extruded, forged and cast products in body and chassis applications. Most important is the selection of proper aluminium materials, i.e. alloy compositions and tempers which have been developed for optimum crash performance. A key requirement is that the applied material exhibits a high energy absorption capacity and deforms well under crash loads, i.e. it is important that it folds without the formations of cracks and does not tend to fragmentation during fracture. Another key aspect is the strength of the applied materials which permits to reduce the weight of the components or structures. In particular, for extrusion, high strength alloys increase the potential for thinner extrusions and increase opportunities for reducing weight. Alloys with promising tensile yield strength results may nonetheless exhibit lower energy absorption. From the prior art it is known that for conventionally extruded aluminium alloy products an increased level of strength deteriorates properties related to the ductility, such as elongation or crash performance.

There is thus a need to propose a better compromise between strength and energy absorption.

There are different ways of evaluating the ability of energy absorption for an extrusion. The best solution is to mimic an impact of the true component in which the extrusion is inserted. It can be for instance mentioned the so-called RCAR Test protocol (Issue 2.0 of September 2010 publicly available at www.rcar.org/Papers/Procedures/BumperTestProcedure.pdf), designed to evaluate the resistance of a bumper when a vehicle crashes in a barrier at a given speed. This test is however cost expensive. A quasistatic test, mimicking the conditions of the RCAR test is often preferred; for that a full RCAR barrier is mounted on an instrumented tensile machine. This barrier fully complied with the standard RCAR Bumper Test protocol as described on pages 30 and 31 of the protocol. The bumper is put into contact with the barrier and then the proper test begin: the barrier is pressed on the bumper at a constant speed of 350 mm/min. Throughout the quasistatic RCAR bumper test the applied compression force at the barrier and the displacement of the back of the bumper beam at its center are recorded.

However, the quasistatic test on true components is not adapted for product development; elementary tests are needed to permit to evaluate serial alloy and temper solutions. True stress-strain curves are good indicators of the ability of crashworthiness: it is desirable to have a material exhibiting in its final use the highest yield strength and elongation. T7 temper is often preferred to achieve such requirement. However, considering only the elongation is not sufficient to predict the ability of the material to fold. It is possible to evaluate this property by applying an axial force parallel to extrusion direction on a hollow extrusion, measuring the force and the displacement during the test and evaluating cracks appearance during folding. This method is presented in EP2993244. However, this test is dependent on the chosen hollow extrusion geometry.

The three points bending test is a classical experiment in mechanics, used to measure the mechanical behavior of a material in the shape of a beam. The beam, of length L, rests on two roller supports and is subject to a concentrated load F at its center.

The VDA 238.100 testing conditions can be used to evaluate the forming behavior and the susceptibility to failure of metallic materials during forming processes dominated by bending deformation (e.g. folding operations) or during crash deformation.

In order to achieve high tensile yield strength, typically higher than 240 MPa, preferably higher than 280 MPa, more preferably higher than 350 MPa and even more than 380 or 400 MPa or 450 MPa or 480 MPa while retaining high crash performance with 6xxx alloys, some technical solutions have been suggested. One of them is a process described in European patent EP 2 653 944, where the applied 6xxx-series aluminium alloy contains high contents of Mg and Si for forming hardening particles and peritectic elements such as Ti or V, and wherein strong Mg excess is needed, because it limits the diffusion of Si to grain boundaries, and as a result apparently improves damage tolerance and crashworthiness.

EP 2 993 244 discloses An aluminium alloy extrusion obtained by following steps: a) casting a billet from a 6xxx aluminium alloy comprising: Si: 0.3-1.5 wt. %; Fe: 0.1-0.3 wt. %; Mg: 0.3-1.5 wt. %; Cu<1.5 wt. %; Mn<1.0%; Zr<0.2 wt. %; Cr<0.4 wt. %; Zn<0.1 wt. %; Ti<0.2 wt. %, V<0.2 wt. %, the rest being aluminium and inevitable impurities; wherein the content of eutectic forming elements (Mg, Si and Cu) is selected so as to present in equilibrium conditions a solidus to solvus difference higher than 5° C., preferably 20° C.; b) homogenizing the cast billet at a temperature 30° C. to 100° C. lower than solidus temperature; c) heating the homogenized billet at a temperature lower than solidus Ts, between Ts and (Ts−45° C.) and superior to solvus temperature; d) cooling until billet temperature reaches a temperature between 400° C. and 480° C. while ensuring billet surface never goes below a temperature substantially close to 350° C.; e) extruding at most a few tens of seconds after the cooling operation the said billet through a die to form at least an extrusion; f) quenching the extrusion down to room temperature; g) optionally stretching the extrusion; h) ageing the extrusion, without beforehand applying on the extrusion any separate post-extrusion solution heat treatment, the ageing treatment being applied such that: crash test samples cut from the said extrusion provided with a regularly folded surface having cracks with a maximal length of 5 mm, when axially compressed such that the crush distance is higher than half their length and tensile test samples having Rp0.2>240 MPa, preferably higher than 280 MPa.

U.S. Pat. No. 4,082,578A discloses an aluminium alloy products particularly for use in automotive applications that may be advantageously produced from a body of aluminium base alloy consisting essentially of, by weight, 0.4 to 1.2% Si, 0.4 to 1.1% Mg, 0.2 to 0.8% Mn, 0.05 to 0.35% Fe, 0.1 to 0.6% Cu, the balance essentially aluminium and incidental elements and impurities. The alloy body may be homogenized at a temperature in the range of 900° to 1100° F. and thereafter worked into wrought products such as sheet or extrusions which are solution heat treated and quenched and aged to a T4 condition prior to forming into automotive body panels, bumpers or the like, which may then be strengthened by heating or aging to the T6 condition.

U.S. Pat. No. 9,359,660 discloses a method comprising: (a) preparing an aluminium alloy body having 0.1-2.0 wt. % silicon and 0.1-3.0 wt. % magnesium for post-solutionizing cold work; (i) wherein the preparing step comprises solutionizing of the aluminium alloy body; (ii) wherein at least one of the silicon and the magnesium is the predominate alloying element of the aluminium alloy body other than aluminium; and (iii) wherein the aluminium alloy body contains sufficient solute to promote at least one of a strain hardening response and a precipitation hardening response to achieve a long-transverse tensile yield strength of at least 60 ksi; and (b) after the preparing step (a), cold working the aluminium alloy body by at least 50%; (c) after the cold working step (b), thermally treating the aluminium alloy body; wherein the cold working and the thermally treating steps are accomplished to achieve the at least 60 ksi long transverse tensile yield strength and a long-transverse elongation of at least 8%.

Wang et al (Mat Science & Engineering A617 (2014) pp 313-317) proposes to apply to 6061 alloy sheets the following processing steps included: (i) Under aged at 180° C. for 2 h, (ii) cold-rolling (CR) with large thickness reductions (75%) at room temperature to increase the strength of the alloy and (iii) re-aging (RA) at 100° C. for 48 h to achieve good tensile properties.

EP2883973 discloses a manufacturing process for obtaining extrusions made from a 6xxx aluminium alloy, wherein the said manufacturing process comprises following steps: a) homogenizing a billet cast from said aluminium alloy; b) heating the said homogenised cast billet; c) extruding the said billet through a die to form at least a solid or hollow extrusion; d) quenching the extrusion down to room temperature; e) optionally stretching the extrusion to obtain a plastic deformation typically between 0.5% and 5%; f) ageing the extrusion without applying on the extrusion any separate post-extrusion solution heat treatment between steps d) and f). characterised in that: i) the heating step b) is a solution heat treatment where: b1) the cast billet is heated to a temperature between Ts−15° C. and Ts, wherein Ts is the solidus temperature of the said aluminium alloy; b2) the billet is cooled until billet mean temperature reaches a value between 400° C. and 480° C. while ensuring billet surface never goes below a temperature substantially close to 400° C.; ii) the billet thus cooled is immediately extruded (step c)), i.e. a few tens seconds after the end of step b2). This process permits to achieve high tensile properties (>400 MPa) for a chemical composition containing 1.13 Si-0.89 Mg-0.53Cu-0.55 Mn—0.19 Fe—0.14 Zr.

The applicant decided to develop a method for manufacturing high strength 6XXX aluminium alloys satisfying the best compromise between strength and energy absorption performance, as assessed by a three points bending test.

Unless otherwise stated, all information concerning the chemical composition of the alloys is expressed as a percentage by weight based on the total weight of the alloy. "6xxx aluminium alloy" or "6xxx alloy" designate an aluminium alloy having magnesium and silicon as major alloying elements. "AA6xxx-series aluminium alloy" designates any 6xxx aluminium alloy listed in "International Alloy Designations and Chemical Composition Limits for Wrought Aluminium and Wrought Aluminium Alloys" published by The Aluminium Association, Inc. Unless otherwise stated, the definitions of metallurgical tempers listed in the European standard EN 515 will apply. Static tensile mechanical characteristics, in other words, the ultimate tensile strength UTS (or Rm), the tensile yield strength at 0.2% plastic elongation YS (or Rp0,2), and elongation A % (or E %), are determined by a tensile test according to NF EN ISO 6892-1. Unless otherwise stated, energy absorption is determined by a three point points bending test, performed according to VDA 238-100 standard with no pre strained before testing and a rectangular material coupon whose width is maximized to minimize influence of triaxial stress conditions in the area of the edges while avoiding intercepting an inner reinforcement wall if a hollow extrusion is tested. The punch with a blade of radius r is pushing on the test coupon so the fold axis being normal to the extrusion direction.

SUMMARY

The present invention relates to extrusions used for automotive application, and more particularly to a method for optimizing strength and energy absorption of 6XXX aluminium alloys extrusions by variations in thermomechanical ageing (TMA), said 6XXX aluminium alloys comprising in weight % Si 0.1-1.2, Cu<1.2, Mn 0.05-1.2, Mg 0.1-1.2, one or more of Cr≤0.3%, Zn≤0.5, Ti≤0.2, Zr≤0.2, V<0.1, rest aluminium and impurities.

Another aim of the invention is the product obtained by the process which offers a better compromise of strength and energy absorption than a product with a similar composition processed conventionally.

Another aim of the invention is the use of said extrusion in energy absorbing structure such as side impact beam, bumper, side sill.

BRIEF DESCRIPTION OF THE DRAWINGS

FIGS. 2 and 3 show that by stretching the material at 10%, it is possible to increase by 14% to 15% the yield strength of non-stretched peak aged material with the invention, while by only 10% with a treatment without pre ageing.

DETAILED DESCRIPTION OF A PREFERRED EMBODIMENT

Figure 1:
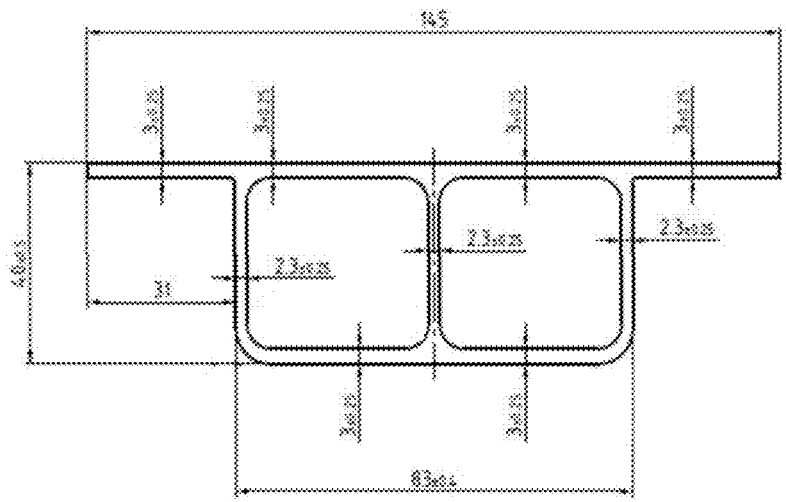
FIG. 1 shows an extrusion having two hollow chambers produced according to the steps of Example 1.

A first object of the invention is a process for manufacturing extrusions comprising the following successive steps:
  a) Casting a billet comprising, in weight %,
  Si 0.1-1.2; Cu≤1.2; Mn 0.05-1.2; Mg 0.1-1.2
  one or more of Cr≤0.3%; Zn≤0.5; Ti≤0.2; Zr≤0.2; V<0.1, rest aluminium and impurities,
  b) Heat treating said cast billet;
  c) Extruding said heat treated billet through a die to form at least a solid or hollow extrusion;
  d) quenching said extrusion down to room temperature;
  e) Natural ageing said extrusion during less than 100 days;
  f) ageing said naturally aged extrusion;
  characterised in that said ageing treatment consists in at least three steps, which are successively
  i) an artificial preageing treatment with a duration t1 at a temperature T1 selected to increase the yield strength of said extrusion between 5% and 20%, preferably between 6% and 19%, and more preferably between 8% and 18% compared to the yield strength obtained after step e), said temperature T1 being typically between 120° C. and 180° C. and said duration t1 being typically between 1 and 100 hours, to obtain an artificially preaged extrusion,
  ii) a plastic deformation of said artificially preaged extrusion between 1% and 80% to obtain a deformed extrusion,
  iii) a final artificial ageing treatment of said deformed extrusion with a duration t2 at a temperature T2, said temperature T2 being typically between 140° C. and 200° C. and said duration t2 being typically between 1 and 100 hours.

According to the invention, the aluminium alloy extrusion is obtained by casting a billet from a 6xxx aluminium alloy comprising in weight %: Si 0.1-1.2; Cu≤1.2; Mn 0.05-1.2; Mg 0.1-1.2 and one or more of Cr≤0.3%; Zn≤0.5; Ti≤0.2; Zr≤0.2; V<0.1, rest aluminium and impurities.

Preferably, the Mg and Si contents are relatively low, i.e. both lower than 1.0%, to have an alloy easy to be extruded. Preferably, there is no Mg in excess compared to the $Mg_2Si$ stoichiometric ratio. Advantageously, the Mg/Si weight ratio is largely lower than stoichiometric weight ratio corresponding to $Mg_2Si$ (1.73), typically lower than 1. More preferably, the Mg content is not higher than 0.9 wt. %. Even more preferably, the Mg content is not higher than 0.7 wt %. More preferably, Si is not higher than 1.1%. In order to obtain an adequate level of strength, in a preferred embodiment Mg and Si are each higher than 0.4%, preferably higher than 0.5% and more preferably higher than 0.6%. The alloy according to the invention contains also preferably copper and Mn dispersoids forming element additions. Cu is preferably added to obtain a strengthening effect, preferably at a level of at least 0.2%. A maximum level of 1.2% is not over exceeded to maintain the extrudability at relative high speed. Cu is preferably maintained at a level not over 1.0%, more preferably at a level not over 0.8% and even more preferably at level not over 0.4%. Preferably, at least one or more other dispersoids forming elements is present such as Cr, Zr, Ti, V to obtain an adequate level of strength. A maximum level of 0.3% of Cr, a maximum level of 0.2% of Zr and a maximum level of 0.1% (value excluded) of V is preferred. A maximum level of 0.2% of Ti is preferred, more preferably a maximum level of 0.21% of Ti and even more preferably a maximum level of 0.10% of Ti. Zn is also preferably added as an optional element to strengthen the material. A minimum level of 0.01 is preferred for at least one of Cr, Zn, Ti, Zr and V, preferably higher than 0.05% and more preferably higher than 0.1%.

In a preferred embodiment, the cast billet comprise the following element in weight % Si 0.6-1.1; Cu 0.2-1.0; Mn 0.3-0.9; Mg 0.4-0.9 and one or more of Cr≤0.3; Ti≤0.1; Zr≤0.2; V<0.1, rest being aluminium and impurities.

Impurities are elements that are not added intentionally. Impurities have a maximum content of iron of 0.5%, preferably 0.3% and other impurities have preferably a maximum content of 0.05% each and 0.15% total. Although Fe is generally an impurity and its content should be maintained with a maximum content of 0.5% and preferably 0.3%, it may be added intentionally in some instances but in a level extending not more than the impurities levels, i.e. with a maximum level of 0.5% and preferably 0.3%. Other impurities have preferably a maximum content of 0.05% each and 0.15% total.

In one embodiment of the invention, the heat treating step b) consists in a pre-heating of the cast billet, between 410° C. and 530° C., before performing the extrusion step.

In one another embodiment, an homogenization is performed before this step of preheating. The homogenization consists in heating the billet at a temperature between 485° C. and 630° C. for a duration between 1 h and 12 h.

In one other embodiment, the heat treating step b) consists in a solution heat treating step. It consists in a solution heat treating at a temperature between Ts−60° C. and Ts, wherein Ts is the solidus temperature of the said aluminium alloy and quenching the billet until billet mean temperature reaches a value between 400° C. and 480° C. while ensuring billet surface never goes below a temperature substantially close to 400° C. before performing the extrusion step. It is preferable that no additional solution heat treatment is performed on the extrusion if the heat treating step of step a) consists in a solution heat treatment.

In yet another embodiment the heat treating step b) comprises homogenizing said cast billet, typically at a temperature between 485° C. and 630° C. for a duration between 1 h and 12 h, to obtain an homogenized billet and solution heat treating said billet at a temperature between Ts−60° C. and Ts, wherein Ts is the solidus temperature of the said aluminium alloy, and quenching until the billet mean temperature reaches a value between 400° C. and 480° C. while ensuring that the billet surface never goes below a temperature of substantially 400° C.

In a preferred embodiment, the solution heat treating step, already described in the previous paragraph is preferably performed on a cast billet containing the following elements in weight % Si 0.6-1.1; Cu 0.2-1.0; Mn 0.3-0.9; Mg 0.4-0.9 and one or more of Cr≤0.3; Ti≤0.1; Zr≤0.2; V<0.1, i.e. the solution heat treating step, already described in the previous paragraph is preferably performed on a cast billet of 6XXX aluminium alloy comprising the following elements in weight % Si 0.6-1.1; Cu 0.2-1.0; Mn 0.3-0.9; Mg 0.4-0.9 and one or more of Cr≤0.3; Ti≤0.1; Zr≤0.2; V<0.1, and impurities with Fe≤0.5%, preferably Fe≤0.3%, and other impurities ≤0.05% each and 0.15% total.

The heat treated billet is extruded through a die to form a solid or a hollow section. In a preferred embodiment, said extrusion is a hollow section. Following, this step, the extrusion can be either press quenched or solution heat treated and quenched. It is however preferred that no additional solution heat treatment is performed on the extrusion if the heat treating step a) consists in a solution heat treatment.

Optionally, after the quench the extrusion is stretched to reduce distortion and/or to straighten the product. The amount of stretching is typically between 0.5% to 5%.

Subsequent to the quench, a natural ageing is performed at room temperature during less than 100 days, preferably less than 20 days and more preferably less than 10 days. To permit to have a consistent process, it is preferable that the natural ageing is controlled and lasts more than 0.2 h. In a more preferred embodiment, the duration of natural ageing after quenching is between 0.2 h to 20 days and more preferably between 1 day and 10 days.

The naturally aged product is then aged according to a thermomechanical ageing, so called TMA which consists in three steps:

an artificial preageing treatment to increase the yield strength of said extrusion from 5% to 20%, preferably from 6% to 19%, and more preferably from 8% to 18% compared to the yield strength of the same alloy after the natural ageing step e), which corresponds to a T4 temper. The duration t1 and the temperature T1 of the preageing treatment are respectively typically between 1 to 100 hours and 120° C. to 180° C. to obtain an artificially preaged extrusion.

a plastic deformation of said artificially preaged extrusion from 1% to 80%, preferably between 1% to 50%, more preferably between 1% to 20, more preferably between 2% to 7% and even more preferably between 2% to 6%. Said plastic deformation is preferably obtained by stretching, or by in any others techniques such as hydroforming or pressing or stamping or bending or roll bending or stretch bending or rotary stretch bending or pulse magnetic forming or flow forming or forging or rolling or drawing or deep drawing or impact or inverse extrusion or punching or blanking Said plastic deformation is preferentially performed at room temperature. In one preferred embodiment, said plastic deformation is applied uniformly on the said artificially preaged extrusion. In one other embodiment, said plastic deformation is applied locally on the said artificially preaged extrusion.

a final artificial ageing treatment of said deformed extrusion with a duration t2 at a temperature T2 whose duration t2 and temperature T2 are selected to reach a maximum yield strength or an overaged temper, typically said temperature T2 is between 140° C. to 200° C. and the duration t2 between 1 to 100 hours. Preferably the artificial aging is such that the equivalent time t(eq) at 170° C. is between 1 and 80 h, preferentially between 1 and 35 hours and more preferably between 2 and 20 hours. Said final artificial ageing treatment may be performed in multiple steps. Multiple steps includes the ramp-up to reach the plateau temperature T2. This ramp up is possibly done by a progressive increase in temperature or by an intermediate plateau. In one embodiment, final artificial ageing is done in two steps with a first step at a temperature T3 and a duration t3 and a second step at a temperature T4 and a duration t4; temperature T3 being lower than temperature T4.

Equivalent time t(eq) at 170° C. is defined by the formula:

$$T(eq) = \int \exp(-Q/RT')dt'/\exp[(-(Q/RT_{ref})]$$

where T' (in Kelvin) is the instantaneous treatment temperature, which changes with time t' (in hours), and $T_{ref}$ is a reference temperature set at 443 K (170° C.). t(eq) is expressed in hours, with the constant R=8.31 J/mol/K and the activation energy of the diffusion of Mg, Q=130400 J/mol. The formula giving t(eq) takes account of the heating and cooling phases.

Another object of the invention concerns the extrusion obtained by the process of the invention.

The extrusion is obtained by using a thermomechanical ageing according to the invention consisting in the following steps:

i) An artificial pre-ageing treatment with a duration t1 at a temperature T1 whose duration t1 and temperature T1 are selected to increase the yield strength of said extrusion from 5% to 20%, preferably from 6% to 19%, and more preferably from 8% to 18% compared to the yield strength of the same alloy after step e) corresponding to T4 value, typically said temperature is between 120° C. as the minimum to 180° C. and the duration between 1 to 100 hours.

ii) A plastic deformation of said artificially pre-aged extrusion from 1% to 80%, preferably between 1% to 50%, more preferably between 1% to 20, more preferably between 2% to 7% and even more preferably between 2% to 6%. Said plastic deformation is preferably obtained by stretching, or by in any others techniques. Said plastic deformation is preferentially performed at room temperature. In one preferred embodiment, said plastic deformation is applied uniformly on the said artificially preaged extrusion. In one other embodiment, said plastic deformation is applied locally on the said artificially preaged extrusion.

iii) A final artificial ageing treatment with a duration t2 at a temperature T2 whose duration t2 and temperature T2 are selected between 140° C. to 200° C. and between 1 to 100 hours. In one preferred embodiment, said final artificial ageing permits to reach a maximum yield strength. In one other embodiment, said final artificial ageing corresponds to an overageing. Said final artificial ageing treatment may be performed in multiple steps. Multiple steps include the ramp-up to reach the plateau temperature T2. This ramp up is possibly done by a progressive increase in temperature or by an intermediate plateau. In one embodiment, final artificial ageing is done in two steps with a first step at a temperature T3 and a duration t3 and a second step at a temperature T4 and a duration t4; temperature T3 being lower than temperature T4.

The product obtained by this process is characterized by an improved energy absorption compare to an extrusion of the same alloy which did not undergo said thermomechanical ageing, according to the invention.

In an embodiment, wherein said plastic deformation of said artificially pre-aged extrusion at step ii of said ageing treatment is between 2% and 7% and preferably between 3% and 6%, the extrusion of the invention is characterized by a specific absorption energy of at least an extra +2%, preferably +3%, more preferably +5% compared to an extrusion of same composition submitted to a thermomechanically ageing corresponding to solely step iii) or steps ii) and iii). Preferably in this embodiment, the cast billet comprise the following element in weight % Si 0.6-1.1; Cu 0.2-1.0; Mn 0.3-0.9; Mg 0.4-0.9 and one or more of Cr≤0.3; Ti≤0.1; Zr≤0.2; V<0.1, rest being aluminium and impurities and said heat treatment of step b) comprises solution heat treating of said billet at a temperature between Ts−60° C. and Ts, wherein Ts is the solidus temperature of the said aluminium alloy and quenching until the billet mean temperature reaches a value between 400° C. and 480° C. while ensuring that the billet surface never goes below a temperature substantially close to 400° C. so that the extrusion exhibit a specific energy absorption superior to 0.42 J/mm³.

The specific energy absorption is measured according to standard conditions of VDA238-100 test. The specific energy absorption is measured on a rectangular coupon defined by its thickness t and its width d. Said specific energy absorption corresponds to the ratio between the energy absorbed for a displacement of 5 mm of the punch and the sample inertia modulus W defined at the center of the cross section, which is defined by $W=(d \times t^2)/6$, said absorbed energy is defined by the integration of the measured effort over the punch displacement of 5 mm.

In a preferred embodiment, said extrusion is a hollow section.

In one embodiment, a bumper is manufactured where the main beam is an extrusion obtained accordingly to the process described in the previous paragraph. This bumper is characterized by a corrected energy absorption measured accordingly to a quasistatic test which presents at least an extra 5% of the corrected energy absorption of an extrusion of similar composition and geometry submitted to a thermomechanically ageing corresponding to solely step iii) or steps ii) and iii) of the process. Said quasistatic test consists in applying said bumper on a barrier defined by the RCAR test protocol and in measuring the applied compression force at the barrier and the displacement of the back of the bumper at its center. The corrected energy absorption is calculated by integrating the applied compression force on a displacement of 60 mm to calculate the energy absorption and by multiplying it by a corrected factor equals to (1+(plastic deformation %)/100), where the term "plastic deformation" corresponds to the plastic deformation at step ii) of the process.

In a broader sense, the cast billet composition may consists in a registered alloy such as AA6008 or AA6082 or AA6060, AA6005A, AA6061, AA6110A or AA6106. It is advantageous if the cast billet composition simultaneously is within the composition of a registered alloy such as AA6008 or AA6082 or AA6060, AA6005A, AA6061, AA6110A or AA6106 and has Si 0.1-1.2; Cu≤1.2; Mn 0.05-1.2; Mg 0.1-1.2 one or more of Cr≤0.3%; Zn≤0.5; Ti≤0.21; Zr≤0.2; V<0.1. In a preferred embodiment, It is advantageous if the cast billet composition simultaneously is within the composition of a registered alloy such as AA6008 or AA6082 or AA6060, AA6005A, AA6061, AA6110A or AA6106 and has in weight % Si 0.1-1.2; Cu≤1.2; Mn 0.05-1.2; Mg 0.1-1.2 one or more of Cr≤0.3%; Zn≤0.5; Ti≤0.2; Zr≤0.2; V<0.1.

In another preferred embodiment, the cast billet with the previous composition is heat treated at step b) of the process accordingly a solution heat treating step. It consist in a solution heat treating at a temperature between Ts−60° C. and Ts, wherein Ts is the solidus temperature of the said aluminium alloy and quenching the billet until billet mean temperature reaches a value between 400° C. and 480° C. while ensuring billet surface never goes below a temperature substantially close to 400° C. before performing the extrusion step. It is preferable that no additional subsequent solution heat treatment is performed. The plastic deformation of step ii) of the thermomechanical ageing is preferably comprised between 1 to 7%, preferably between 2% to 6%. For this preferred embodiment, it is observed that the specific energy absorption, measured according to VDA 238.100 standard is at least equal to 0.42 J/mm3. In a preferred embodiment, said extrusion is a hollow section, which has at least a yield strength of 380 MPa, and more preferably 400 MPa.

Another object of the invention is the use the product obtained by the process of the invention in an energy absorbing structure such as side impact beam, bumper, side sill.

EXAMPLES

Example 1

An extrusion having two hollow chambers represented at FIG. 1 has been produced according to the following steps:

A billet has been cast with a composition A listed in Table 1. Then homogenized at a temperature at above 520° C. during 5 hours. Said homogenized billet was then solution heat treated 100 seconds at a soaking temperature above 535° C., such that said soaking temperature is between the solidus temperature Ts of composition A, estimated at 589° C. and Ts−60° C. It was then quenched with a water cooling device giving a heat transfer flow of approximately 1 kW/m2/° C. until billet surface temperature reached 460° C. 45 seconds later, the billet was then introduced into the container of the extrusion press and extruded to obtain an extrusion according to FIG. 1. The extrusion speed was controlled such that the surface exit temperature be close to 550° C. The extrusion was then quenched down to room temperature with a cooling device, spraying water on the extrusion exiting from the extrusion press.

TABLE 1

| | Chemical composition in weight % | | | | | | |
|---|---|---|---|---|---|---|---|
| | Si | Fe | Cu | Mn | Mg | Cr | Zr |
| A | 0.8 | 0.2 | 0.7 | 0.5 | 0.8 | 0.1 | 0.1 |

The extrusion was then stored at room temperature during 3 days, corresponding to a natural ageing of three days.

Said extrusion was then cut into 9 parts, labelled A-0 to A-8.

Tensile properties of one part A-0 was characterized just after natural ageing. And other parts were submitted to artificial ageing or thermomechanical ageing. A-5 to A-8 parts were treated according to the process of the invention.

Part A-1 was peak aged during 12 h at 170° C. Part A-2 was stretched at 5% and then peak aged during 8 h at 170° C. Part A-3 was stretched at 9.9% and then peak aged during 4 h at 170° C. Part A-4 was pre-aged 8 h at 140° C. Part A-5 was pre-aged 8 h at 140° C. and then stretched at 3.6% and then peak aged during 8 h at 170° C. Part A-6 was pre-aged 8 h at 140° C. and then stretched at 5.0% and then peak aged during 8 h at 170° C. Part A-7 was pre-aged 8 h at 140° C. and then stretched at 8% and then peak aged during 4 h at 170° C. Part A-8 was pre-aged 8 h at 140° C. and then stretched at 9.9% and then peak aged during 4 h at 170° C.

Due to plastic deformation, for the parts submitted to stretching, the thickness of the walls constituting the extrusion was reduced. The reduction was measured and varied depending on the applied strain and the considered web. Higher strain, higher reduction. The front side of the extrusion corresponding to the widest side with the flange presents lower reduction as illustrated in Table 2. Similarly, the total width and height of the extrusion was reduced. Due to the presence of the flange on the front side, the height was measured on the rear side and the front side (see Table 2).

TABLE 2

| | | | | | | | | | | |
|---|---|---|---|---|---|---|---|---|---|---|
| Shrinkage measurements on outer dimensions and wall thicknesses | | | | | | | | | | |
| Applied strain | Width (mm) | Reduct. % | Height REAR (mm) | Reduct. % | Height - FRONT (mm) | Reduct. % | Thickness REAR (mm) | Reduct. % | Thickness FRONT (mm) | Reduct. % |
| 0% | 40.00 | — | 82.85 | — | 145.30 | — | 2.962 | — | 2.878 | — |
| 3.6% | 39.55 | 1.1 | 82.20 | 0.8 | 143.65 | 1.1 | 2.889 | 2.5 | 2.822 | 1.9 |
| 5.0% | 39.40 | 1.5 | 81.90 | 1.1 | 143.10 | 1.5 | 2.869 | 3.1 | 2.790 | 3.1 |
| 9.9% | 38.75 | 3.1 | 80.85 | 2.4 | 141.90 | 2.3 | 2.751 | 7.1 | 2.701 | 6.1 |

Room temperature tensile tests were performed according to standard ASTM E 8/E 8M with non-proportional tensile specimen. Tensile specimen were machined from extrusions and have a width of 12.5 mm and a gauge length of 60 mm.

The results of these tensile tests in terms of yield strength at 0.2%, Ultimate tensile strength and elongation measured on the specimen as manufactured according to the conditions described in the previous paragraph are given in Table 3.

TABLE 3

| | | | | | |
|---|---|---|---|---|---|
| Tensile properties | | | | | |
| | Preaged | Plastic Strain [%] | Peak Ageing | YS (MPa) | UTS (MPa) | total Elong. (%) |
| A-0 | — | — | — | 200 | 330 | 20 |
| A-1 | — | — | 170° C./12 h | 373 | 408 | 12.5 |
| A-2 | — | 5.0% | 170° C./8 h | 393 | 407 | 10.7 |
| A-3 | — | 9.9% | 170° C./4 h | 412 | 428 | 10.8 |
| A-4 | 140° C./8 h | — | — | 230 | 360 | 17 |
| A-5 | 140° C./8 h | 3.6% | 170° C./8 h | 399 | 420 | 11.5 |
| A-6 | 140° C./8 h | 5.0% | 170° C./8 h | 406 | 422 | 10.1 |
| A-7 | 140° C./8 h | 8.0% | 170° C./4 h | 425 | 447 | 10.3 |
| A-8 | 140° C./8 h | 9.9% | 170° C./4 h | 428 | 444 | 11.1 |

Figure 2:
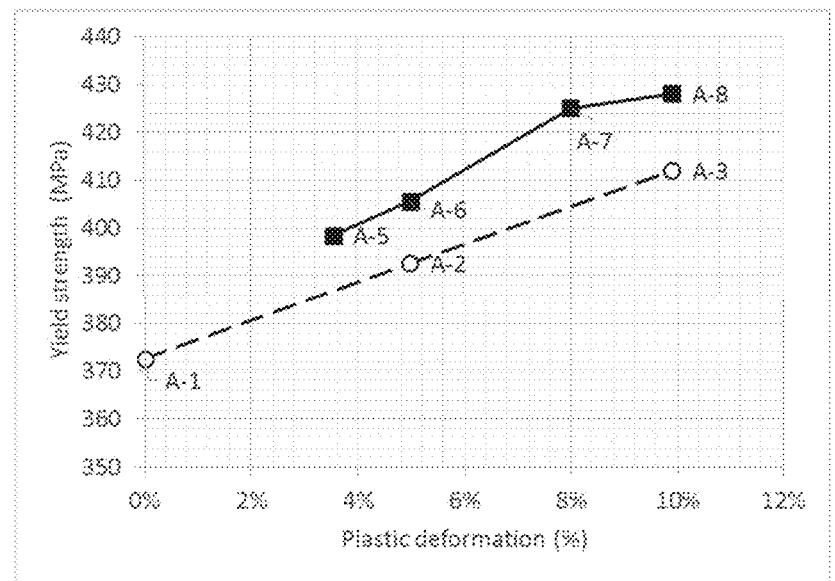
FIGS. 2 and 3 show the relationship between yield strength and stretching (plate deformation).
Figure 3:
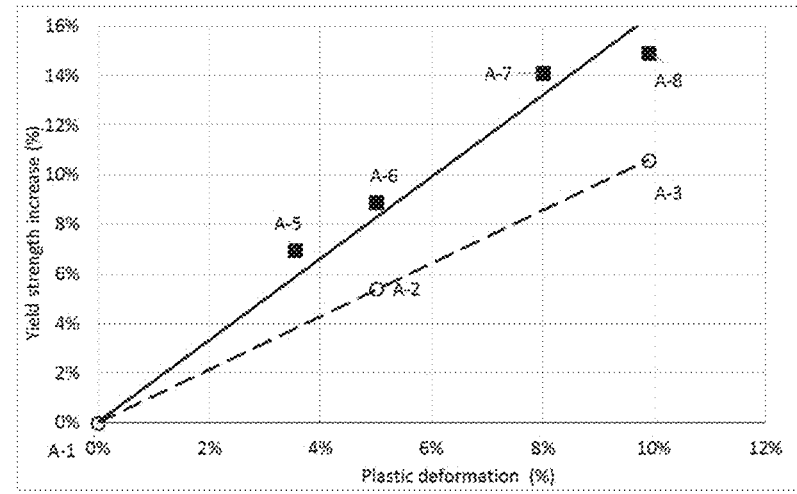

It is observed (see FIG. 2) that applying a stretching on the material with or without pre-ageing permits to increase the yield strength of the non-stretched peak aged temper (A-1). However, it is well observed that the parts treated according to the invention present a higher yield strength than the parts treated with a similar stretching but without pre ageing. According to the invention, higher stretching provides higher yield strength. By stretching the material at 10%, it is possible to increase by 14% to 15% the yield strength of non-stretched peak aged material with the invention, while by only 10% with a treatment without pre ageing (see FIG. 3)).

Alternatively according to the invention 60% less strain is required to achieve the same yield strength versus non pre-aged material, making the material significantly more ductile for a given strength improvement.

By comparing the yield strength of A-0 and A-4, preageing conditions have been chosen to increase the yield strength by 15% with regards to the naturally aged samples.

The crash behavior was estimated by a "three-point bending test" according to VDA 238-100 (issued December 2010).

The samples consisted in coupons with rectangular dimensions of 30 mm×60 mm. Coupons were machined from the extrusion and taken on the flanges of 3 mm thick, the dimension "60" being parallel to the extrusion direction. They were all milled down to 2.60 mm thickness. The punch radius r is equal to 0.4 mm.

At the beginning of the test the punch is put into contact with the coupon with a pre-load of 100 Newton. Once contact is established, the movement of the punch is indexed to zero. The test then is to move the punch so as to perform the "three-point bending" of the coupon. The test stops when damage led to a strong fall on the punch, at least 60 Newton, compared to the maximum force, or when the punch has reached maximum stroke allowed.

During the test the force-displacement curve is recorded, which is used to calculate the absorbed energy by integrating the force to a certain displacement.

Table 4 lists the absorbed energy measured for a displacement of 5 mm according to the conditions of the three point bending test described in the previous paragraph.

The specific energy absorption at 5 mm intrusion is calculated and corresponds to the ratio between the specific energy absorption at 5 mm intrusion and the inertia modulus W at the center of the coupon calculated accordingly the following equation: $W=(d \times t^2)/6$, where t is the thickness of the coupon, and d its width.

TABLE 4

| | | | | |
|---|---|---|---|---|
| Absorbed energy according to three points bending test | | | | |
| | Preaged | Plastic Strain [%] | Peak Ageing | Absorbed Energy @ 5 mm Intrusion [J] | Spec. Energy abs. at @ 5 mm Intrusion [J/mm³] |
| A-1 | — | 0.0% | 170° C./12 h | 14.02 | 0.41 |
| A-2 | — | 5.0% | 170° C./8 h | 14.01 | 0.40 |
| A-3 | — | 9.9% | 170° C./4 h | 13.61 | 0.41 |
| A-5 | 140° C./8 h | 3.6% | 170° C./8 h | 14.50 | 0.43 |
| A-6 | 140° C./8 h | 5.0% | 170° C./8 h | 14.50 | 0.43 |
| A-7 | 140° C./8 h | 8.0% | 170° C./4 h | 13.99 | 0.41 |
| A-8 | 140° C./8 h | 9.9% | 170° C./4 h | 13.61 | 0.40 |

Figure 6:
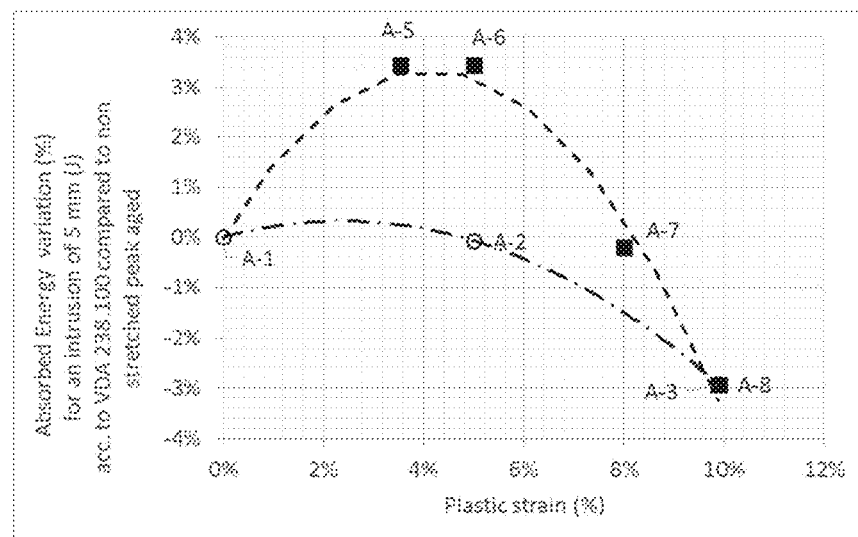
FIG. 6 shows an optimum range of stretching permitting to maximize the absorbed energy is obtained for a stretching of between 3% to 6%.
Figure 7:
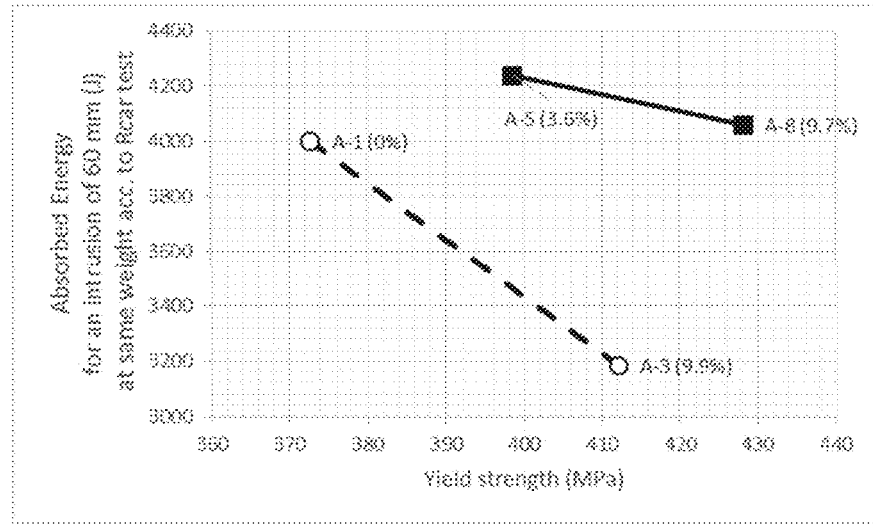
FIG. 7 shows the compromise between yield strength and the absorbed energy after RCAR test at given iso-weight.

The comparison of the specific absorbed energy in the three point bending tests at 5 mm intrusion in FIG. 6 shows that in every case the pre-aged parts tend to absorb more energy than the non-pre-aged ones (A-2, A-3), when the stretch is less than 8%. An optimum range of stretching permitting to maximize the absorbed energy is obtained for a stretching of between 3% to 6%. (FIG. 7)

Four fully manufactured crash management system (CMS) were tested according to a quasistatic RCAR test, simulating the condition of a full RCAR test which is normally done on a full car bumping a barrier.

Each CMS consists of two crashboxes from extruded AA6008, which were manually welded to a base plate and afterwards to the roll bent bumper beam. The transverse beam was constituted by the parts submitted to different ageing: A-1, A-3, A-5 and A-8.

Figure 4:
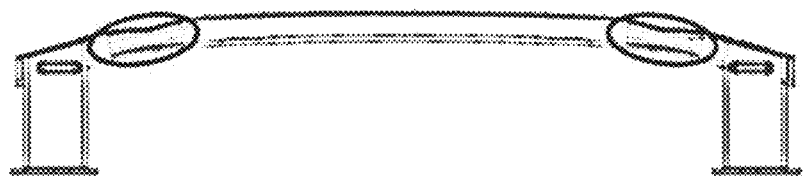
FIG. 4 shows a CAD drawing of prototype CMS used for quasistatic test.
Figure 5:
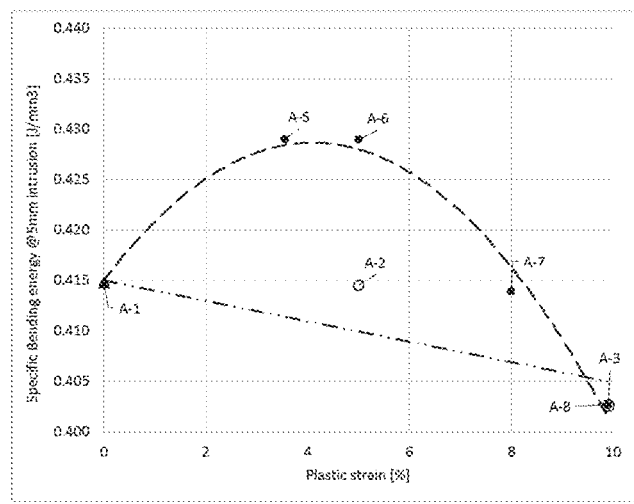
FIG. 5 shows the comparison of the specific absorbed energy in the three point bending tests at 5mm intrusion.

A reference bumper beam was obtained using an extrusion process not using the present invention (A-1). Another example bumper beam was obtained without applying any pre-ageing and by applying a strain of 9.9% (A-3). Another bumper beams were obtained following the invention with an applied strain ranging from 3.7% (A-5) and 9.7% (A-8). In order to be fully representative of a real crash management system, triggers, marked in ovals in FIG. 4 which corresponds to a CAD drawing of prototype CMS used for quasistatic test, were pressed in the bumper beams before welding and peak-ageing. Those triggers act as a hinge to reduce the force on the welding seam on the outside of the crashbox in a crash event.

Performance of the four crash management systems RCAR was assessed using a "quasistatic" RCAR bumper test. For that a full RCAR barrier was mounted on an instrumented tensile machine. This barrier fully complied with the standard RCAR Bumper Test protocol (Issue 2.0 of September 2010 publicly available at http://www.rcar.org/Papers/Procedures/BumperTestProcedure.pdf) as described on pages 30 and 31 of the protocol. Each of the crash management systems were tightened to the testing machine chassis so the bumper beam and the RCAR barrier were set insuring a 100% overlap between themselves in length and width. The crush management system could not move during the test.

Before beginning of the test, the machine is zeroed so the barrier is moved toward the bumper until both of them get into contact without any compression of the barrier nor deformation of crash management system. Then the proper test begin in which the barrier is pressed on the bumper at a constant speed of 350 mm/min. Throughout the quasistatic RCAR bumper test the applied compression force at the barrier and the displacement of the back of the bumper beam at its center were recorded.

For each crash management system the force displacement curve at the barrier was recorded until the center of the back of the bumper beam reached an intrusion of 100 mm Thanks this curve the energy absorption of each crash management system was calculated and compared at a 60 mm intrusion corresponding to typical energy requirements of RCAR test when using the tested materials.

Table 5 lists the absorbed energy measured after the RCAR test for a displacement of 60 mm according to the conditions of the RCAR test described in the previous paragraph. Due to the fact that the stretched parts have a lower weight than the reference part (A-1), a one-to-one comparison of the absorbed energy is not appropriate. To compensate for the different weights of the bumper beams because of the applied plastic strains and resulting difference of section a corrected factor is applied and corresponds to the following formula:

$$\left(1 + \frac{\text{Applied plastic deformation (\%)}}{100}\right)$$

TABLE 5

Absorbed energy according to RCAR test

| | Preaged | Plastic Strain [%] | Peak Ageing | RCAR Absorbed energy @ 60 mm (J) | RCAR Absorbed energy @ 60 mm @ same weight (correcting factor) (J) |
|---|---|---|---|---|---|
| A-1 | — | 0.0% | 170° C./12 h | 4000 | 4000 |
| A-3 | — | 9.9% | 170° C./4 h | 2900 | 3184 |
| A-5 | 140° C./8 h | 3.6% | 170° C./8 h | 4150 | 4241 |
| A-8 | 140° C./8 h | 9.7% | 170° C./4 h | 3700 | 4059 |

FIG. 7 illustrates the compromise between yield strength and the absorbed energy after RCAR test at given isoweight. The TMA according to the invention permits to keep a high yield strength and a high absorbed energy. On the contrary the thermomechanical ageing without preageing does not permit to sustain a high absorbed energy compared to the reference (A-1, treated in peak aged without plastic deformation).

Figure 8:
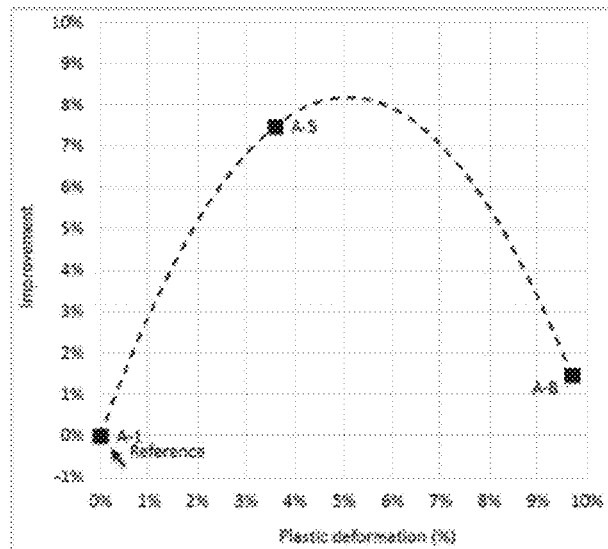
FIG. 8 shows the obtained improvement of energy absorption at iso weight compared to the reference A-1, submitted to a one step ageing versus the applied plastic deformation.

The thermomechanical ageing according to the invention (A-5) permits to obtain a higher absorbed energy than an artificial ageing without plastic deformation (A-1). FIG. 8 illustrates the obtained improvement of energy absorption at iso weight compared to the reference A-1, submitted to a one step ageing versus the applied plastic deformation. The bell curve illustrates the optimized range of plastic deformation to apply to the extrusion during the thermomechanical ageing, which must be between 2% to 7% to obtain an improvement of at least 5%.

Example 2

A flat extrusion of 35×3 mm section has been produced according to the following steps:

A billet has been cast with composition B listed in Table 6. Then homogenized at above 520° C. for 5 hours. Said homogenized billet was then solution heat treated 100 seconds at a soaking temperature near 560° C., which is between solidus temperature of composition B estimated at 597° C. and "597° C.-60° C.". It was then quenched with a water cooling device giving a heat transfer flow of approximately 1 kW/m2/° C. until billet surface temperature reached 460° C. 30 seconds later the billet was then introduced into the container of the extrusion press and extruded to obtain a flat section 35×3 mm. The extrusion speed was controlled such that the surface exit temperature be close to 550° C. The extrusion was then quenched down to room temperature with a cooling device spraying water on the extrusion exiting from the extrusion press.

TABLE 6

Chemical composition in weight %

| | Si | Fe | Cu | Mn | Mg | Cr | Zr |
|---|---|---|---|---|---|---|---|
| B | 1.0 | 0.2 | 0.00 | 0.6 | 0.7 | 0.1 | 0.1 |

The extrusion was then stored at room temperature during 15 days, corresponding to a natural ageing of fifteen days. Said extrusion was then cut into 2 parts. One part B-1 was peak aged during 8 h at 175° C. One part B-2 was treated according to the invention: pre-aged during 8 h at 140° C., plastically deformed at 3% by stretching and peak aged during 4 h at 175° C.

Room temperature tensile tests were performed according to standard ASTM E 8/E 8M with non-proportional tensile specimen. Tensile specimen were machined from extrusions and have a width of 12.5 mm and a gauge length of 60 mm.

The results of these tensile tests in terms of yield strength at 0.2%, Ultimate tensile strength and elongation measured on the specimen as manufactured according to the conditions described in the previous paragraph are given in Table 7.

TABLE 7

Tensile properties

| | Preaged | Plastic deformation [%] | Peak Ageing | YS (Mpa) | UTS (MPa) | total Elong. A5 (%) |
|---|---|---|---|---|---|---|
| B-1 | | | 175° C./8 h | 339 | 368 | 11 |
| B-2 | 140° C./8 h | 3% | 175° C./4 h | 348 | 378 | 12.5 |

Example 3

An extrusion corresponding to the same section as example 1 (see FIG. 1) has been produced according to the following steps:

A billet has been cast with composition C listed in Table 8. Then homogenized at a temperature above 520° C. for 5 hours. Said homogenized billet was heated at a temperature ranging from 480° C. to 500° C. and then introduced into the container of the extrusion press. The extrusion speed was controlled such that the surface exit temperature was higher than 550° C. and lower than solidus temperature. The extrusion was then quenched down to room temperature with a cooling device spraying water on the extrusions.

TABLE 8

Chemical composition in weight %

| | Si | Fe | Mn | Mg | Cr | Ti |
|---|---|---|---|---|---|---|
| C | 1.0 | 0.3 | 0.4 | 0.6 | 0.1 | 0.1 |

The extrusion was then stored at room temperature during 9 days, corresponding to a natural ageing of fifteen days.

Said extrusion was then cut into 3 parts. One part C-1 was peak aged during 8 h at 170° C. One part C-2 was plastically deformed at 1.4% by stretching and peak aged during 8 h at 170° C. One part C-3 was treated according to the invention: pre-aged during 8 h at 140° C., plastically deformed at 1.4% by stretching and peak aged during 8 h at 170° C.

Room temperature tensile tests were performed according to standard ASTM E 8/E 8M with non-proportional tensile specimen. Tensile specimen were machined from extrusions and have a width of 12.5 mm and a gauge length of 60 mm.

The results of these tensile tests in terms of yield strength at 0.2%, Ultimate tensile strength measured on the specimen as manufactured according to the conditions described in the previous paragraph are given in Table 9.

TABLE 9

Tensile properties

| | Preaged | Plastic deformation [%] | Peak Ageing | YS (MPa) | UTS (MPa) |
|---|---|---|---|---|---|
| C-1 | | | 170° C./8 h | 322 | 354 |
| C-2 | | 1.4% | 170° C./8 h | 319 | 356 |
| C-3 | 140° C./8 h | 1.4% | 170° C./8 h | 333 | 356 |

Figure 9:
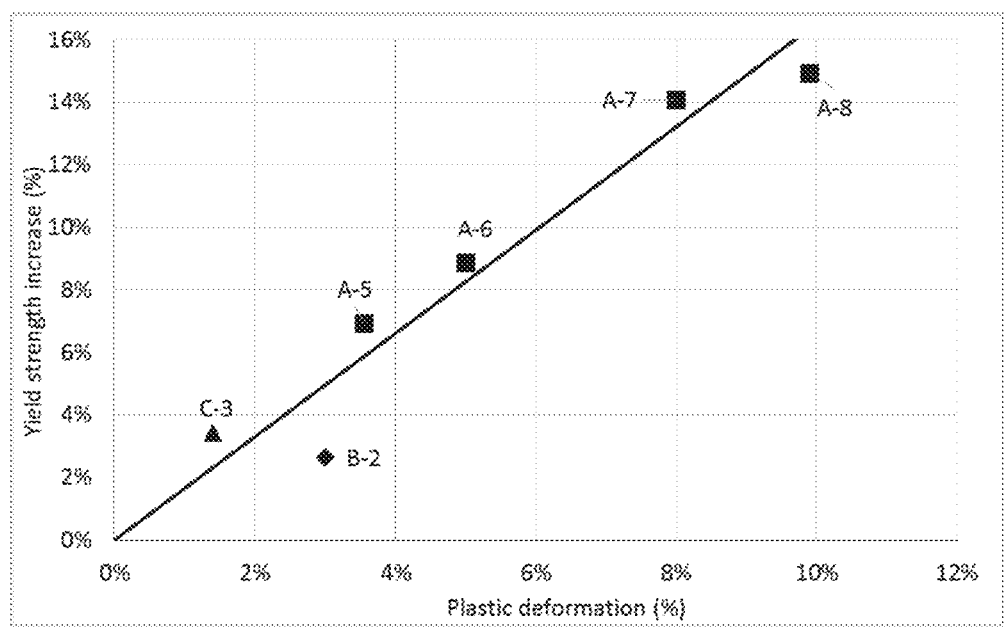
FIG. 9 shows the TMA conditions (pre-ageing + 1.4% stretch + peak aged) permits to increase by about 3.4% the yield strength.

The TMA conditions (pre-ageing+1.4% stretch+peak aged) permits to increase by about 3.4% the yield strength, as shown on FIG. 9.

Example 4

A solid flat extrusion has been produced corresponding to the dimensions 65 mm×6 mm.

A billet has been cast with composition D listed in Table 10. Said cast billet was homogenized and solution heat treated at a temperature of 540° C., then quenched until a temperature reaches a value between 400° C. and 480° C. and then introduced into the container of the extrusion press and pressed. The extrusion was then quenched down to room temperature with a cooling device spraying water on the extrusions.

Said quenched extrusion has been cut into parts, stored at room temperature and then aged according to different conditions. D1 to D8 reference samples have been stored at room temperature during 5 hours and D9 during 1000 h.

Different aging conditions have been done on these parts and summarized in Table 11.

D-1 was peak aged during 12 h at 170° C. D-8 and D-9 were plastically deformed, respectively at 3% and 50% by cold rolling and peak aged during respectively 8 h at 170° C. and 30 h at 140° C.

D-2 to D7 were treated according to the invention for different plastic deformation from 3% to 75% obtained by cold rolling: see Table 11 for details.

Room temperature tensile tests were performed according to standard ASTM E 8/E 8M with non-proportional tensile specimen. The results of these tensile tests in terms of yield strength at 0.2%, ultimate tensile strength measured on the specimen as manufactured according to the conditions described in the previous paragraph are given in Table 11.

TABLE 10

Chemical composition in weight %

| | Si | Fe | Cu | Mn | Mg | Cr | Zr |
|---|---|---|---|---|---|---|---|
| D | 0.8 | 0.2 | 0.8 | 0.5 | 0.7 | 0.1 | 0.1 |

TABLE 11

Tensile properties

| | Preaged | Plastic deformation obtained by cold rolling [%] | Final Ageing (Peak Aged) | YS (MPa) | UTS (MPa) | Remark |
|---|---|---|---|---|---|---|
| D-1 | | | 170° C./12 h | 381 | 412 | Reference |
| D-2 | 140° C./8 h | 3 | 170° C./8 h | 409 | 430 | Invention |
| D-3 | 140° C./8 h | 8 | 150° C./2 h & 170° C./4 h | 448 | 457 | Invention |

TABLE 11-continued

| | | Plastic deformation obtained by cold rolling [%] | Final Ageing (Peak Aged) | YS (MPa) | UTS (MPa) | Remark |
|---|---|---|---|---|---|---|
| | Preaged | | | | | |
| D-4 | 140° C./8 h | 12 | 150° C./2 h & 170° C./ 2 h | 464 | 467 | Invention |
| D-5 | 140° C./8 h | 25 | 140° C./45 h | 468 | 490 | Invention |
| D-6 | 140° C./8 h | 50 | 140° C./30 h | 481 | 501 | Invention |
| D-7 | 140° C./8 h | 75 | 140° C./30 h | 487 | 507 | Invention |
| D-8 | — | 3 | 170° C./8 h | 395 | 415 | Reference |
| D-9 | — | 50 | 140° C./30 h | 471 | 490 | Reference |

It is observed a benefit of the invention on the yield strength at 0.2% over conventional ageing conditions. Conventional ageing conditions here includes thermal treatment, like what has been done on D-1 or plastic deformation followed by a thermal treatment, like what have been done on D-8 and D-9. In particular, at iso plastic deformation, i.e. at 3% or 50%, the yield strength of a product treated according to the invention is increased by 3.5% or 2.2% (comparison between D2 and D8, D6 and D9).

The invention claimed is:

1. An extrusion made of an aluminium alloy of 6xxx series obtainable by a manufacturing process comprising the following successive steps:
   a) casting a billet comprising, in weight %,
   Si 0.6-1.0; Cu 0.2-1.0; Mn 0.05-1.2; Mg 0.1-1.2 and one or more of Cr 0.01-0.3; Zn≤0.5; Ti≤0.21; Zr≤0.01-0.2; V<0.1,
   rest aluminium and impurities,
   b) heat treating said cast billet at a temperature between Ts-60° C. and Ts, wherein Ts is the solidus temperature of said aluminium alloy and quenching until the billet mean temperature reaches a value between 400° C. and 480° C., while ensuring that the billet surface never goes below a temperature substantially close to 400° C.;
   c) extruding said heat treated billet through a die to form a solid or hollow extrusion;
   d) quenching said extrusion down to room temperature;
   e) natural ageing said extrusion during less than 100 days;
   f) ageing said naturally aged extrusion;
   wherein said ageing treatment comprises at least three steps, which are successively
   i) an artificial preageing treatment with a duration t1 at a temperature T1 selected to increase the yield strength of said extrusion between 5% and 20%, compared to the yield strength obtained after step e), to obtain an artificially preaged extrusion, wherein said temperature T1 is between 120° C. and 180° C. and said duration t1 is between 1 and 100 hours,
   ii) a plastic deformation of said artificially preaged extrusion between 1% and 80% to obtain a deformed extrusion,
   iii) a final artificial ageing treatment of said deformed extrusion with a duration t2 at a temperature T2, wherein said temperature T2 is between 140° C. and 200° C. and said duration t2 is between 1 and 100 hours.

2. An extrusion according to claim 1 wherein said plastic deformation of said artificially pre-aged extrusion at step ii of said ageing treatment is between 2% and 7%, and wherein said extrusion after step iii) of said ageing treatment comprises at least an additional 2%, of a specific bending energy absorption compared to an extrusion of said composition which has been submitted to a thermomechanically ageing corresponding to solely step iii) or to steps ii) and iii) of said ageing treatment,
said specific energy absorption being measured according to standard conditions of VDA238-100 test on a rectangular coupon defined by its thickness t and its width d, the fold axis of the coupon being normal to the extrusion direction, said specific energy absorption corresponding to the ratio between the energy absorbed for a displacement of 5 mm of the punch and the sample inertia modulus W defined at the center of the cross section by $W=(d \times t^2)/6$, said absorbed energy is defined by the integration of the measured effort over the punch displacement of 5 mm.

3. An extrusion according to claim 2, wherein the alloy composition comprises the following elements in weight %:
Si 0.6-1.1; Cu 0.2-1.0; Mn 0.3-0.9; Mg 0.4-0.9 and one or more of Cr≤0.3; Ti≤0.1; Zr≤0.2; V<0.1, rest aluminium and impurities,
wherein said solid or hollow extrusion comprises a specific energy absorption superior to 0.42 J/mm$^3$.

4. A bumper comprising an extrusion according to claim 2, comprising a corrected energy absorption measured according to a quasistatic test which presents at least an extra 5% of the corrected energy absorption of an extrusion of similar composition and geometry submitted to a thermomechanical ageing corresponding solely to step iii) or steps ii) and iii), said quasistatic test comprising applying said bumper on a barrier defined by the RCAR test protocol and measuring the applied compression force at the barrier and the displacement of the back of the bumper at a center thereof; the corrected energy absorption being calculated by integrating the applied compression force on a displacement of 60 mm to calculate the energy absorption and by multiplying it by a corrected factor equals to (1+(plastic deformation %)/100), where the plastic deformation corresponds to the plastic deformation applied at step ii).

5. An extrusion according to claim 1 as an energy absorbing structure.

6. The extrusion according to claim 1,
wherein in i), the artificial preageing treatment with a duration t1 at temperature T1 is selected to increase the yield strength of said extrusion between 6% and 19%, and compared to the yield strength obtained after step e).

7. The extrusion according to claim 1,
wherein in i), the artificial preageing treatment with a duration t1 at temperature T1 is selected to increase the yield strength of said extrusion between 8% and 18% compared to the yield strength obtained after step e).

8. The extrusion according to claim 2 wherein said plastic deformation of said artificially pre-aged extrusion at step ii of said ageing treatment is between 3% and 6%, and wherein said extrusion after step iii) of said ageing treatment comprises at least an additional 5% of a specific bending energy absorption compared to an extrusion of said composition which has been submitted to a thermomechanically ageing corresponding to solely step iii) or to steps ii) and iii) of said ageing treatment.

9. The extrusion according to claim 2, wherein said extrusion has a specific energy absorption, measured according to VDA 238.100 standard, of at least 0.42 J/mm$^3$.

10. The extrusion according to claim 1, wherein said extrusion is a hollow section and has a yield strength of at least 380 MPa.

11. The extrusion according to claim 1, wherein said extrusion is a hollow section and has a yield strength of at least 400 MPa.

12. The extrusion according to claim 5, wherein the energy absorbing structure is a side impact beam, a bumper, or a side sill.

13. The extrusion according to claim 9, wherein said extrusion is a hollow section and has a yield strength of at least 380 MPa.

14. The extrusion according to claim 9, wherein said extrusion is a hollow section and has a yield strength of at least 400 MPa.

* * * * *